United States Patent [19]

Tomoyori et al.

[11] Patent Number: 4,543,578
[45] Date of Patent: Sep. 24, 1985

[54] COURSE GUIDANCE AND DISPLAY APPARATUS FOR VEHICLES

[75] Inventors: Makoto Tomoyori; Masashi Fuse, both of Iwate, Japan

[73] Assignee: Alps Electric Co., Ltd., Japan

[21] Appl. No.: 407,111

[22] Filed: Aug. 11, 1982

[30] Foreign Application Priority Data

Aug. 11, 1981 [JP] Japan .................................. 56-125500

[51] Int. Cl.[4] ................................................ G08C 1/12
[52] U.S. Cl. ....................................... 340/995; 340/988; 358/103; 364/460
[58] Field of Search ............... 340/990, 995, 988, 783, 340/705, 716; 358/105, 140, 206, 93, 103; 364/424, 460, 444, 448, 449, 521; 353/12

[56] References Cited

U.S. PATENT DOCUMENTS

| | | | |
|---|---|---|---|
| 3,209,645 | 10/1965 | Guttmann | 353/12 |
| 3,681,752 | 8/1972 | Cuddihy | 340/995 |
| 3,781,846 | 12/1973 | Eichelberger | 340/716 |
| 4,024,493 | 5/1977 | Ingels | 340/995 |
| 4,061,995 | 12/1977 | McCrickerd | 340/995 |
| 4,139,889 | 2/1979 | Ingels | 340/995 |
| 4,158,201 | 6/1979 | Smith | 340/783 |
| 4,314,154 | 2/1982 | Minoura | 358/206 |
| 4,326,218 | 4/1982 | Coutta | 358/206 |
| 4,347,530 | 8/1982 | Stetson | 358/206 |
| 4,371,893 | 2/1983 | Rabeisen | 358/93 |
| 4,390,253 | 6/1983 | Lobb | 353/12 |

Primary Examiner—John W. Caldwell, Sr.
Assistant Examiner—Michael F. Heim
Attorney, Agent, or Firm—Guy W. Shoup

[57] ABSTRACT

A course guidance apparatus for vehicles has a direction sensor and a speed sensor carried on the vehicle and a traveling locus corresponding to detection signals from the direction sensor and the speed sensor is plotted in a manner to be superposed on a map film and displayed on a projection screen. The traveling locus is traced by a laser beam on a trace plate having electrooptic, optomagnetic, or incoherent-to-coherent light conversion properties. The superposed picture is clearly viewed, and the misregistration between the map and the traveling locus is avoided.

7 Claims, 5 Drawing Figures

COURSE GUIDANCE AND DISPLAY APPARATUS FOR VEHICLES

BACKGROUND OF THE INVENTION

The present invention relates to a course guidance and display apparatus for vehicles. More particularly, it relates to a course guidance and display apparatus for vehicles wherein the traveling locus of the vehicle recorded in a trace device and a map on a film are superposedly projected on a projection screen so as to display the position in which the vehicle exists.

Prior to the application of the present invention, the inventors have developed a course guidance apparatus for vehicles as shown in FIG. 1. The course guidance apparatus for vehicles is arranged, for example, in front of the driver seat of the vehicle. As illustrated in FIG. 1, it is provided with a CRT display 1 and is so constructed that a traveling locus 2 obtained on the basis of detection signals from a direction sensor (not shown) and a speed sensor (not shown) which are separately carried on the vehicle is plotted (or traced) on the screen of the CRT display 1. On the other hand, a map sheet 3 depicted on, e.g., a transparent film is detachably attached to the front of the screen of the CRT display 1. The attached map sheet 3 is fixed by map fixing means 4. At the starting of a drive, the vehicle is caused to travel a certain distance, and the traveling locus is traced. Then, an x-direction, a y-direction and an inclination $\theta$ are set with a positioning switch 5 so that the traveling locus 2 may extend along a desired road on the map.

The vehicular course guidance apparatus has a major advantageous feature in that by superposing the map sheet 3 on the screen of the CRT display 1, the traveling locus is extended along the road on the map, and it can be expected as one future line of course guidance apparatuses for vehicles. The apparatus shown in FIG. 1, however, uses the CRT display 1 for the tracing of the traveling locus and has on account of the self-luminescence of the CRT display 1 the disadvantage that when the sunlight falls on the screen in the daytime, the CRT display 1 is difficult to indicate a clear traveling locus 2 even with a raised brightness thereof. Another disadvantage is that since the map sheet 3 and the screen of the CRT display 1 are not held in close contact, the map and the traveling locus do not correspond exactly when the CRT display is not viewed frontways. Still another disadvantage concerns the replacement of maps. In a case where a new map is required for, e.g., the reason that the traveling locus has come to the edge of a map in the course of the drive with one map sheet 3 attached, the maps need to be manually replaced. In replacing the maps, a new map sheet 3' to be subsequently attached must be picked out from among a large number of map sheets. Particularly when maps of small contraction scale are used, the replacement of the map sheets is somewhat troublesome. A further disadvantage is that since the CRT display 1 has a considerably large volume, the installation place in the case of mounting the apparatus on the automobile is limited.

SUMMARY OF THE INVENTION

The present invention has been made in order to solve the disadvantages described above, and has for its object to provide a course guidance and display apparatus for vehicles wherein a traveling locus in a trace device and a map on a film are projected on a projection screen in a superposed fashion so as to indicate the position in which the vehicle exists.

PREFERRED EMBODIMENTS OF THE INVENTION

The course guidance and display apparatus for vehicles according to the present invention is constructed of the three portions of a retrieval device portion for retrieving a microfilm on which maps are depicted, a projector portion for enlarging the map to a size in which the driver of the vehicle is easy to watch the map, and a trace device portion for tracing (or plotting or recording) the traveling locus of the vehicle.

Figure 2:
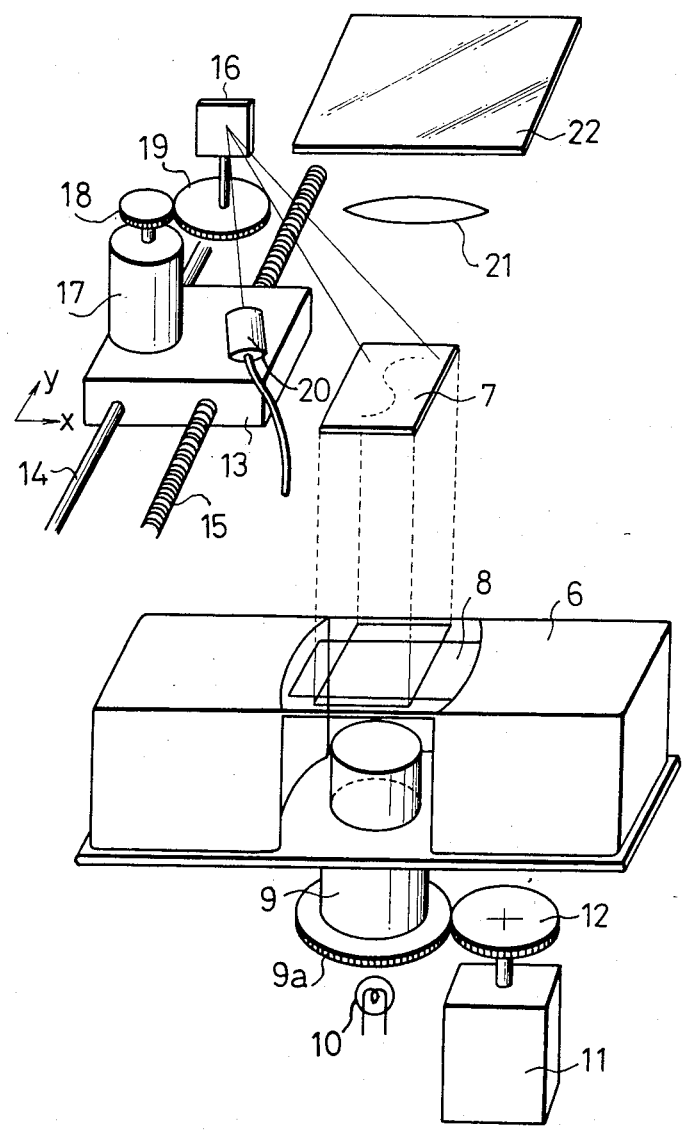
FIG. 2 is an exploded view for explaining an embodiment of a course guidance and display apparatus for vehicles according to the present invention.

Referring to FIG. 2, numeral 6 designates a microfilm cartridge loading part, on which a display element or trace plate 7 for tracing the traveling locus is mounted. Under the trace plate 7, a microfilm 8 on which various maps and map information are depicted is slidably disposed. The microfilm cartridge loading part 6 is unitarily formed with a projector beam guide 9, by which light from a light source for a projector, 10 is guided so as to illuminate the microfilm 8 and the trace plate 7. A gear 9a provided in the projector beam guide 9 meshes with a driving gear 12 which is mounted on a stage rotating motor 11. A trace portion to be described later is formed unitarily with the microfilm cartridge loading part 6 (as indicated by dotted lines in the figure, the trace plate 7 is situated substantially in contact with the microfilm 8). By operating the stage rotating motor 11, therefore, these devices can rotate so that the traveling direction of the automobile and the direction of the traveling locus may agree at all times.

The trace device portion for tracing the traveling locus includes a laser depiction stage 13 which moves in the direction of a y-axis indicated in FIG. 2. The laser depiction stage 13 is penetratingly provided with a depiction stage guide shaft 14 for guiding the y-axial direction, and also has a y-axial driving screw 15 held in threadable engagement therewith. The laser depiction stage 13 is set at a predetermined position in the y-axial direction by rotating the y-axial driving screw 15. A stepping motor 17 for rotating a rotary mirror 16 is disposed on the laser depiction stage 13, and the rotary mirror 16 is rotated a predetermined angle by a gear 19 meshing with a gear 18 mounted on the stepping motor 17.

The trace device portion for tracing the traveling locus is provided with a coupling lens 20 which throws onto the rotary mirror 16 the laser beam transmitted by optical fibers. The laser beam emergent from the coupling lens 20 has its position on the trace plate 7 in the y-axial direction controlled by the rotation of the y-axial driving screw 15 and has its position in the x-axial direction controlled by the rotation of the rotary mirror 16 rotated on the basis of the operation of the stepping motor 17, thereby to be scanned on the surface of the trace plate 7 in the x- and y-axial directions.

Numeral 21 denotes a projecting magnifier lens, which magnifies a superposed picture which consists of the map depicted on the microfilm 8 and the traveling locus written on the trace plate 7 and which is projected by the projector light source 10. The magnified picture is projected on a projection screen 22 which is disposed in front of the driver seat of the vehicle.

The traveling locus is written onto the transparent trace plate 7 in such a way that the laser beam (transmitted from a writing light source through the optical fibers) is scanned on the trace plate 7 in the above-stated manner by the laser depiction stage 13. The transparent trace plate 7 has its light transmissivity changed owing to the irradiation with the elaser beam, so that the unirradiated part and the irradiated part of the trace plate are clearly distinguished. By utilizing the difference of the light transmissivities, the traveling locus is traced on the trace plate 7.

Using, e.g., a central processing unit (CPU), the laser depiction stage 13 processes the signals of drive or travel information obtained from a direction sensor (not shown) and a speed sensor (not shown) which are carried on the automobile. The above signals are converted into displacement signals in the x- and y-coordinates corresponding to a contraction scale on the microfilm 8. On the basis of the displacement signals, the stepping motor 17 and a stepping motor (not shown) for rotating the y-axial driving screw 15 are respectively driven required quantities. The trace plate 7 which bears the traveling locus thus depicted and the microfilm 8 on which the map is depicted are magnified to a desired size by the projector light light source 10 and the projecting magnifier lens 21 under the superposed state in the illustrated case and then projected on the projection screen 22.

The trace plate 7 for depicting the traveling locus is made of piezoelectric ceramics, for example, PLZT. The material PLZT has a great electrooptic effect and electrooptical scattering effect. The ceramics obtained by doping the PLZT material with iron becomes colered when irradiated with, e.g., light not longer than 4800 Å, but it restores transparency in the original thermal equilibrium state when heated at about 200° C. The iron-doped PLZT has the property of such photochromism, and the photochromism owing to the iron doping can be utilized for tracing the traveling locus.

Further, an optomagnetic memory medium represented by the ternary alloy of amorphous GdTbFe or an incoherent - coherent light image converter element can be used as the trace plate 7 for the traveling locus.

Figure 3:
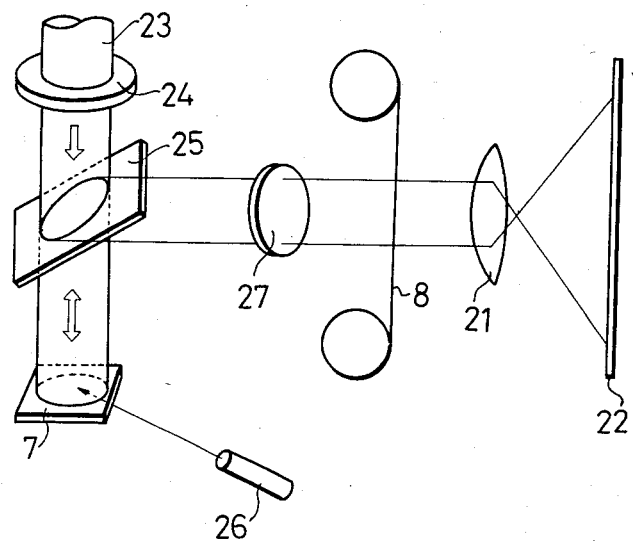
FIGS. 3 and 4 show another embodiment of the course guidance and display apparatus for vehicles according to the present invention.
Figure 4:
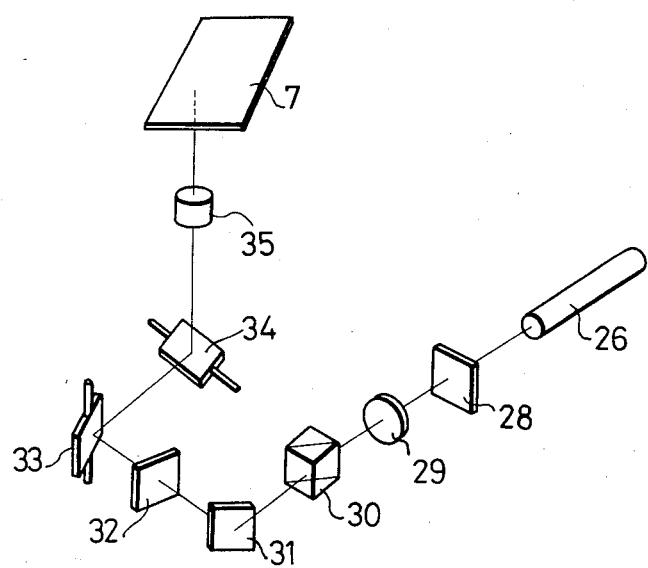

FIGS. 3 and 4 show another embodiment of the vehicular course guidance and display apparatus according to the present invention. Numerals 7, 8, 21 and 22 correspond to those in FIG. 2. Numeral 23 designates a beam for projection (for reading), which passes through a polarizer 24. The projection beam 23 polarized by the polarizer 24 illuminates the element of the trace plate on which the traveling locus is depicted (the optomagnetic memory medium or the incoherent - coherent light image converter element), through a semitransparent mirror 25 which is interposed between the polarizer 24 and the trace plate 7. As will be described in detail with reference to FIG. 4, the traveling locus is written on the trace plate 7 by a writing light source 26. Owing to the irradiation with the traveling locus by the writing light source 26, unequal voltage profiles develop in the irradiated and unirradiated parts of the trace plate 7, and "optical changes" corresponding to the intensities of electric fields appear in the trace plate 7 in accordance with the voltage patterns. When, under such state, the projection beam 23 for reading illuminates the trace plate 7 on which the traveling locus is depicted, it is reflected from the trace plate 7 subjected to the "optical changes", and the reflected beam is reflected by the semitransparent mirror 25 and enters an analyzer 27. The reflected beam having passed through the analyzer 27 affords an output picture or traveling locus subjected to the light intensity modulation. The beam bearing the traveling locus as thus obtained illuminates the microfilm 8 interposed between the analyzer 27 and the projecting magnifier lens 21, so that the aforementioned traveling locus and the map depicted on the microfilm 8 are simultaneously magnified and projected on the projection screen 22.

The information written in the trace plate 7 are erased by applying an electric field in the reverse direction under uniform illumination.

FIG. 4 illustrates an aspect of writing into the trace plate 7 shown in FIG. 3. Numerals 7 and 26 correspond to those in FIG. 3. In the case illustrated in FIG. 4, the controls in the x- and y-axial directions for tracing the traveling locus on the trace plate 7 are made by rotary mirrors. As illustrated in FIG. 4, a laser beam from the writing light source 26 passes through a diffraction grating 28 as well as a magnifier lens 29. Then, it passes through a polarization beam splitter 30 and comes from a stationary mirror 31 into a quarter-wavelength plate 32, whereupon it passes through a tangential mirror 33 for controlling the x-axial direction. Thus, the position of the beam in the x-axial direction is determined. Further, the beam enters a tracking mirror 34 for controlling the y-axial direction and has its position in the y-axial direction determined. Thereafter, the beam is thrown from an objective lens 35 onto the trace plate 7 for depicting the traveling locus. The angles of rotations of the tangential mirror 33 for controlling the positioning in the x-axial direction and the tracking mirror 34 for controlling the positioning in the y-axial direction are controlled by the displacement signals processed by means of the central processing unit (CPU) on the basis of the traveling information obtained from the direction sensor and the speed sensor, as explained with reference to FIG. 2.

Figure 5:
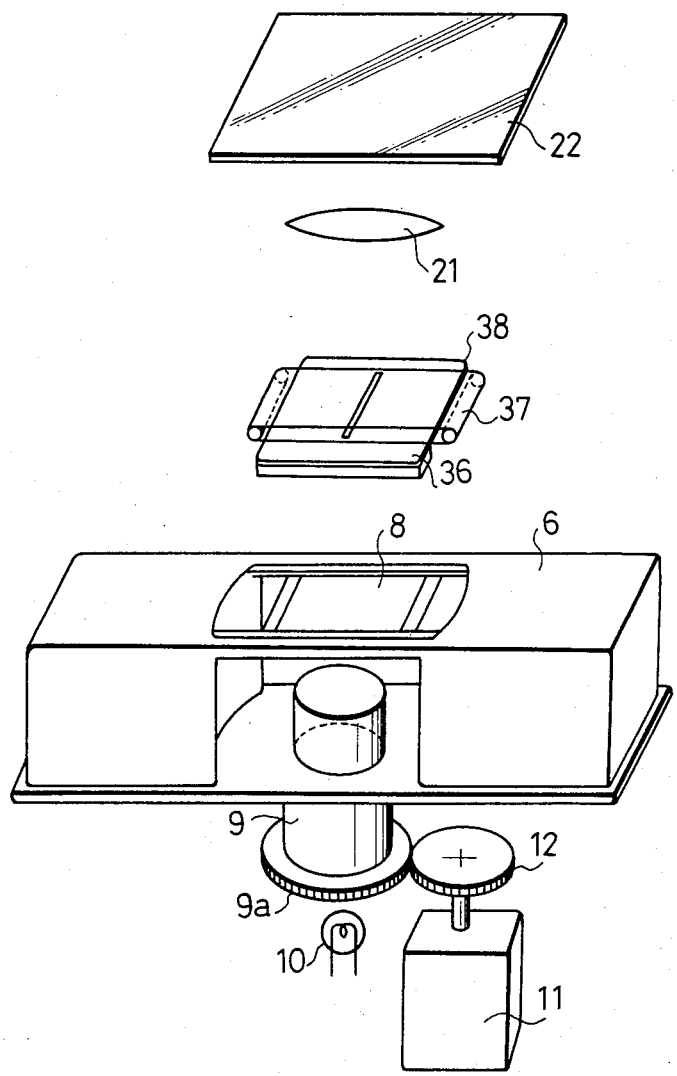
FIG. 5 shows another embodiment of a trace device for tracing a traveling locus in the course guidance and display apparatus for vehicles according to the present invention.

FIG. 5 shows another embodiment of the trace device for tracing the traveling locus in the vehicular course guidance and display apparatus according to the present invention. Numerals 6, 8 to 12, 21 and 22 correspond to those in FIG. 2. Numeral 36 indicates a very small-sized X-Y plotter, on which the traveling locus is depicted. To the end of simultaneously projecting the map depicted on the microfilm 8 and the traveling locus depicted on a recording sheet 37 in the X-Y plotter 36, a flat bed 38 is made transparent. The recording sheet 37 for recording the traveling locus is transparent or semitransparent, and is formed with an endless loop both the ends of which are connected. Although no illustration is made in the figure, the traveling locus can be erased at both the ends of the loop. Herein, the recording sheet 37 corresponds to the foregoing trace plate. The map depicted on the microfilm 8 and the traveling locus depicted on the recording sheet 37 of the X-Y plotter 36 are thrown onto the projection screen 22 as a superposed enlarged picture is such a way that, as explained with reference to FIG. 2, they are illuminated by the projector light source 10 and passed through the projecting magnifier lens 21.

Figure 1:
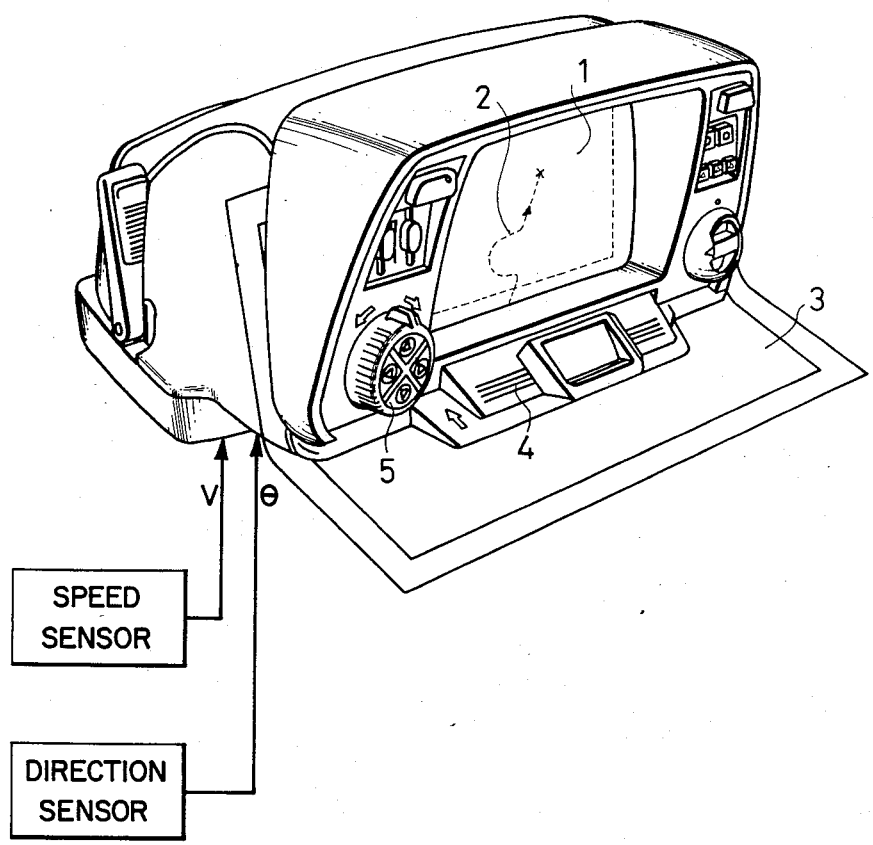
FIG. 1 is a perspective view of a prior-art course guidance and display apparatus for vehicles.

There is also considered a method in which, in lieu of the map sheet 3 in FIG. 1, map information are recorded on a video disk and are displayed on the CRT display 1. This method, however, is not suitable for the following reason. The video disk has a memory capacity as enormous as 30 to 40 Gbits on its one side. By way of example, when it is intended to cover the whole of Japan with maps each having a contraction scale of 1:250,000 and the size of the A5-format, about 250 maps including overlap parts are sufficient, and they can be easily stored in the single video disk. Map information, however, include both picture information and character information. Further, in case of the Japanese language, Chinese characters need to be displayed. When a color CRT is employed for the display of the map information, the resolution is approximately 0.3 mm in terms of the dot pitch. Supposing by way of example that one Chinese character is indicated with 24×24 dots, the indicated character becomes as large as 7.2 mm square (0.3×24=7.2). In spite of the high recording density of the video disk, therefore, the area of the map which can be covered by one frame.

Conversely, when it is intended to cover a large area, a map with thin character information is displayed and is also difficult of use. It is accordingly concluded that the method in which the map information are recorded on a rolled microfilm or microfish and are magnified and projected is a display method which affords the highest information density.

As set forth above, according to the present invention, a map on a film and a traveling locus on a trace plate are superposed magnified and projected on a projection screen, so that even when the sunlight falls on a screen, a picture is clear and that even when the screen is viewed from a position deviating from its front, the misregistration between the map and the traveling locus is avoided. Since a zoom lens can also be employed as a projecting magnifier lens, the map and the traveling locus can be enlarged to a desired size.

Map information and the traveling locus of the trace plate are superposedly magnified by the projection system as described above. Therefore, even in case of using a microfilm of 35 mm for recording the map information, the depiction area of the trace plate is 35×25 mm² or so. Accordingly, a very small-sized vehicular course guidance and display apparatus is provided, and the vibration resistance and the shock resistance as the apparatus for vehicular use are increased.

A high resolving power as a recording material is exhibited in such a manner that it is 80 to 400 lines/mm with a color microfilm and that it is 200 to 400 lines/mm with a monochromatic microfilm.

When transparent map sheets each having, e.g., the size of the A5-format are replaced with the color microfilm, the road map of the whole of Japan can be received in one volume of microfilm cartridge or several sheets of microfish, and hence, the handling is facilitated.

What is claimed is:

1. A course guidance and display apparatus for vehicles comprising:
    a direction sensor;
    a speed sensor;
    a trace device provided with a laser depiction stage, trace plate, and a rotary mirror, said rotary mirror being irradiated with a laser beam so as to scan the trace plate and trace a traveling locus corresponding to detection signals from said direction sensor and said speed sensor;
    a map on microfilm;
    a projector provided with a light source and a projecting magnifier lens between which said trace plate and said map are interposed such that said projector magnifies and projects the traveling locus traced by the trace device and the map in superposed fashion; and
    a projection screen on which the traveling locus and map is projected,
    wherein the traveling locus is traced when said trace plate is iradiated with the laser beam, and the traced information is erased in an erasing mode of the trace device.

2. A course guidance and display apparatus for vehicles as defined in claim 1, wherein said trace plate is made of a material having an electrooptic effect, and said traced information is erased by applying an electric field with uniform illumination of the trace plate.

3. A course guidance and display apparatus for vehicles as defined in claim 1, wherein said trace plate is made of piezoelectric ceramics.

4. A course guidance and display apparatus for vehicles as defined in claim 1, wherein said trace plate is made of an optomagnetic memory medium.

5. A course guidance and display apparatus for vehicles as defined in claim 1, wherein said trace plate is made of an incoherent-to-coherent light image converter element.

6. A course guidance and display apparatus for vehicles as defined in claim 1, wherein said trace device is provided with a tangential mirror and a tracking mirror, which control a laser beam so as to depict the traveling locus on the trace plate.

7. A course guidance and display apparatus for vehicles as defined in claim 1, wherein said projector is provided with a polarizer, a semitransparent mirror, an analyzer and a projecting magnifier lens; a projecting beam having passed through said polarizer illuminates said trace plate through said semitransparent mirror; the beam reflected from said trace plate is reflected by said semitransparent mirror and enters said analyzer; and the beam from said analyzer illuminates said map and is magnified and projected by said projecting magnifier lens.

* * * * *